Patented June 8, 1937

2,083,303

UNITED STATES PATENT OFFICE 2,083,303

PRODUCTION OF ACTIVATED CARBON

Franz Krczil, Aussig on the Elbe, Czechoslovakia

No Drawing. Application January 24, 1936, Serial No. 60,704. In Great Britain January 21, 1935

3 Claims. (Cl. 252—3)

This invention relates to improvements in the manufacture of moulded or shaped activated carbon and is a continuation in part of my former application Serial Number 4,395 of 1935, filed on 31st, January, 1935. The object of the present invention is to provide a simple, effective and quicker method of producing a hard active carbon of high adsorptive power in the shaped or moulded state, which may be for instance in the form of threads, sticks or cartridges of any desired shape.

Activated carbon is generally made from pulverized organic raw material which is mixed with suitable activating agents, such as zinc chloride or phosphoric acid and heated to a high activating temperature. The product is a granular or powdered activated carbon, but for many technical uses a shaped or moulded active carbon is required. Such shaped active carbon has been produced by forming the desired shapes in the powdered raw material or in the partially carbonized raw material before activation and to prevent crumbling of these shapes during the activation process, a fine powdered charcoal has been added with a binder and heated to a temperature under 100° C. for 24 hours or special raw materials have been chosen which were found to resist the disruptive or crumbling action of the activation treatment.

An object of this invention is to provide a process of obtaining a shaped activated carbon without requiring protracted heating or the addition of powdered charcoal as a binder or the selection of special peats which have the property of resisting the crumbling action of the activation process. The invention resides in the technical application of my discovery that by a relatively short heat treatment it is possible to destroy the tendency of the uncarbonized raw material to crumble or spring apart into fragments during activation. Not only does my novel heat treatment destroy the tendency of the organic material to spring apart during activation, but with proper care, I am able in some cases to produce a satisfactory shaped active carbon without employing any binding agent to mix with the powdered raw material before the high pressure moulding process. This is to say that by means of my invention, I not only destroy the disruptive tendency of the organic material but actually produce some modification in that raw material which gives to the said raw material the cohesive properties required to retain the shaped form during and after activation. The product of my improved process is a moulded shape of hard active carbon of high adsorptive power.

According to this invention the organic raw material such as sawdust, peat, lignite or the like is impregnated with known activating agents such as zinc chloride or phosphoric acid and well stirred while being heated to a temperature in excess of 100° C. and not more than 200° C. until the preliminarily and only very partially carbonized mass assumes a kneadable form whereupon after this novel preliminary treatment it is moulded under pressure, baked and activated in known manner.

The following numerical example is given as illustrating one method of carrying this invention into practical use. 50 grams of finely sifted sawdust are mixed with 100 cubic centimeters of a zinc chloride solution of 1.85 specific gravity. This mixture is heated while being constantly stirred, the temperature of the heating being 120° C. To commence with, the mixture is a yellowish color, but under the action of the heating the color first changes to brown and then to a dark reddish brown or a black. This state is reached after one to one and a half hours. The mass in this state is partially carbonized and in this precarbonized state it is of a somewhat plastic form and may be moulded under pressure in the known high pressure moulding presses. The form or die of the press is preferably heated to about 100° C. so as not to interrupt the heat treatment. On removal from the forming press the shapes are passed to an oven where they are further heated till hard, the temperature being carefully controlled in order to avoid crumbling. The oven temperature should be from 120°–200° C. The hardening process is completed in about two hours. The hard shapes are then transferred to an activating retort, preferably of the known rotary type, where they are brought to a temperature of 450° C. to 600° C. and activation is completed in about four hours. The resulting shapes are then cooled, washed and dried in known manner. The finished brick or shape, with the quantities above stated, is about 19 grams weight, that is to say about 38% of the starting weight of the sawdust.

It is not always essential but cases do arise where it is advisable to add to the mixture some known organic or inorganic binding agent. When used, such binding agent is preferably added during the preliminary heating and mixing process, that is to say during the special heat treatment which constitutes the novel feature of this invention. The addition is also preferably made after the heat treatment has been carried out to a partial extent and the mass shows initial signs of plasticity and some of the activating agent may very conveniently be mixed with the chosen binding agent.

I have found the above heat treatment process applicable for the manufacture of formed activated carbon from other raw materials than the specific examples given, including various forms of peat. By the term "heat treatment" is to be understood the application of heat as such and not merely the rise in temperature incidental to a mixing or kneading process.

The term "carbonizing and activating agent in the form of a solution" as used in the appended claims is intended to mean the impregnating solutions of phosphoric acid, zinc chloride and sulphuric acid or combinations of these now well known in processes for the production of activated carbon.

I claim:

1. The preliminary treatment of organic raw material which is to be manufactured into shaped pieces of active carbon which consists in mixing the comminuted organic raw material with an activating agent of the group consisting of zinc chloride and phosphoric acid and simultaneously subjecting said mixture during continued stirring and for a period materially less than twelve hours to a partial carbonizing process at a temperature over 100° C., and less than 200° C.

2. The preliminary treatment of organic raw material which is to be manufactured into shaped pieces of active carbon which consists in mixing the raw material with an activating agent of the group consisting of zinc chloride and phosphoric acid in solution, stirring said mixture and simultaneously heating it to a temperature greater than 100° C. and less than 200° C., said stirring and heating being continued for one to one and a half hours, then immediately molding the resulting hot plastic and partially carbonized mass into the desired shapes under pressure.

3. A form of the process claimed in claim 1, characterized in that a binding agent is added to the mass under treatment at the point in the simultaneous mixing and heat treatment process when the said mass commences to become plastic.

FRANZ KRCZIL.